(12) United States Patent
Ball, IV

(10) Patent No.: US 9,884,774 B1
(45) Date of Patent: Feb. 6, 2018

(54) HIGHLY RETENTIVE AUTOMATICALLY SKIMMABLE TANK

(71) Applicant: KBK Industries, LLC, Rush Center, KS (US)

(72) Inventor: Will Dexter Ball, IV, Bixby, OK (US)

(73) Assignee: KBK INDUSTRIES, LLC, Rush Center, KS (US)

( * ) Notice: Subject to any disclaimer, the term of this patent is extended or adjusted under 35 U.S.C. 154(b) by 317 days.

(21) Appl. No.: 14/613,619

(22) Filed: Feb. 4, 2015

(51) Int. Cl.
| C02F 1/40 | (2006.01) |
| C10G 33/06 | (2006.01) |
| C02F 101/32 | (2006.01) |
| B04C 3/06 | (2006.01) |
| B04C 5/04 | (2006.01) |

(52) U.S. Cl.
CPC ............ C02F 1/40 (2013.01); C10G 33/06 (2013.01); B04C 3/06 (2013.01); B04C 5/04 (2013.01); *C02F 2101/32* (2013.01); *C02F 2209/005* (2013.01); *C02F 2209/42* (2013.01)

(58) Field of Classification Search
None
See application file for complete search history.

(56) References Cited

U.S. PATENT DOCUMENTS

| 554,598 | A | | 2/1896 | Gilmore |
| 654,965 | A | * | 7/1900 | Franke .................. B01D 21/02 |
| | | | | 137/140 |
| 815,407 | A | | 3/1906 | Cooper |
| 1,005,977 | A | | 10/1911 | Jones |
| 1,373,664 | A | | 4/1921 | Lorraine |
| 1,490,462 | A | | 4/1924 | Gill |
| 1,512,079 | A | | 10/1924 | Bergin |
| 1,512,358 | A | | 10/1924 | Neil |
| 1,515,126 | A | | 11/1924 | Lennox |
| 1,535,721 | A | | 4/1925 | Gill |
| 1,547,100 | A | | 7/1925 | Daughdrill |
| 1,625,052 | A | | 4/1927 | Ray |
| 1,693,849 | A | | 12/1928 | Lorraine |
| 1,915,436 | A | | 6/1933 | Moore et al. |
| 1,916,065 | A | | 6/1933 | Mount et al. |
| 2,047,989 | A | * | 7/1936 | Woelflin ............ B01D 17/0205 |
| | | | | 204/568 |
| 2,228,401 | A | | 1/1941 | Pressler |
| 2,420,115 | A | | 5/1947 | Walker et al. |
| 2,530,054 | A | | 11/1950 | Gordon |

(Continued)

*Primary Examiner* — Terry Cecil
(74) *Attorney, Agent, or Firm* — Leydig, Voit & Mayer, Ltd.

(57) ABSTRACT

An automatically skimmable tank for removing oil from water. A water inlet with a 90 degree elbow that is turned sideways and points slight upward causes flow to first impinge on the wall of the tank then flow upward helically around the tank's internal diameter (ID) to maximize retention time so that oil separates from the water. At the tank's upper fluid level, the water flows to the center of the tank, then spirals downward to the bottom and under the incoming fluid flow before exiting via the water outlet. Oil is removed from the tank via an upwardly extending oil outlet riser provided with two horizontal anti-vortex plates. A level transmitter senses the oil-gas and the oil-water interfaces and a programmed PLC activates an oil valve and a low shear oil transfer pump to remove oil from the tank when the oil layer surrounds the anti-vortex plates.

8 Claims, 2 Drawing Sheets

(56) References Cited

U.S. PATENT DOCUMENTS

| | | | |
|---|---|---|---|
| 2,614,649 A | 10/1952 | Walker et al. |
| 2,701,620 A | 2/1955 | Crawford |
| 2,705,053 A | 3/1955 | Morris |
| 2,882,994 A | 4/1959 | Lovelady et al. |
| 2,998,096 A | 8/1961 | Snipes |
| 3,273,318 A | 9/1966 | Meyer |
| 4,120,795 A | 10/1978 | Laval, Jr. |
| 4,139,463 A | 2/1979 | Murphy et al. |
| 4,140,344 A | 2/1979 | de Turville |
| 4,424,068 A | 1/1984 | McMillan |
| 4,428,839 A | 1/1984 | Davies et al. |
| 4,622,118 A | 11/1986 | Chimenti et al. |
| 4,778,494 A | 10/1988 | Patterson |
| 4,830,755 A | 5/1989 | Hardin |
| 4,880,533 A | 11/1989 | Hondulas |
| 4,966,705 A | 10/1990 | Jamieson et al. |
| 4,987,922 A | 1/1991 | Andrepont et al. |
| 5,030,255 A | 7/1991 | Tarpley |
| 5,073,266 A | 12/1991 | Ball, IV |
| 5,122,280 A | 6/1992 | Russell et al. |
| 5,202,026 A | 4/1993 | Lema |
| 5,254,076 A | 10/1993 | Chow et al. |
| 5,334,291 A | 8/1994 | Gavlin et al. |
| 5,378,376 A | 1/1995 | Zenner |
| 5,622,621 A | 4/1997 | Kramer |
| 5,711,374 A | 1/1998 | Kjos |
| 5,714,068 A | 2/1998 | Brown |
| 5,827,357 A | 10/1998 | Farion |
| 5,840,198 A | 11/1998 | Clarke |
| 6,042,722 A | 3/2000 | Lenz |
| 6,089,381 A | 7/2000 | Gordon |
| 6,228,148 B1 | 5/2001 | Aaltonen et al. |
| 6,250,473 B1 | 6/2001 | Golightley et al. |
| 6,337,023 B1 | 1/2002 | Broussard et al. |
| 6,364,940 B1 | 4/2002 | Prueter et al. |
| 6,409,808 B1 | 6/2002 | Chamberlain et al. |
| 6,554,141 B2 | 4/2003 | Carriere |
| 6,638,437 B2 | 10/2003 | Terrien et al. |
| 6,709,500 B1 | 3/2004 | West |
| 7,105,044 B2 | 9/2006 | Konishi et al. |
| 7,157,007 B2 | 1/2007 | Frankiewicz et al. |
| 7,374,668 B1 | 5/2008 | DiValentin et al. |
| 7,422,683 B2 | 9/2008 | Park |
| 7,753,215 B2 | 7/2010 | Gigas et al. |
| 8,012,359 B2 | 9/2011 | Parkinson |
| 8,075,785 B2 | 12/2011 | Dufrene et al. |
| 8,114,283 B2 | 2/2012 | Parkinson |
| 8,226,820 B1 | 7/2012 | Wegner |
| 8,257,588 B2 | 9/2012 | Mori et al. |
| 8,277,547 B2 | 10/2012 | Folkvang |
| 8,333,825 B2 | 12/2012 | Sarshar et al. |
| 8,496,740 B1 | 7/2013 | Ball, IV |
| 8,906,142 B2 | 12/2014 | Peuker |
| 9,199,251 B1 | 12/2015 | Ball, IV |
| 2003/0154860 A1 | 8/2003 | Millia |
| 2005/0011170 A1 | 1/2005 | Christiansen et al. |
| 2007/0084340 A1 | 4/2007 | Dou et al. |
| 2007/0215541 A1 | 9/2007 | Kampfer |
| 2008/0251441 A1 | 10/2008 | Gibbs |
| 2009/0173232 A1* | 7/2009 | Folkvang ............... B01D 17/00 96/183 |
| 2010/0269696 A1 | 10/2010 | Sarshar et al. |
| 2013/0083620 A1 | 4/2013 | Hypes et al. |
| 2013/0199137 A1 | 8/2013 | Hallgren et al. |
| 2014/0275690 A1 | 9/2014 | Hernandez et al. |

* cited by examiner

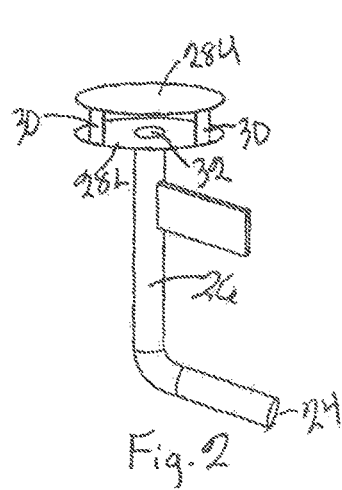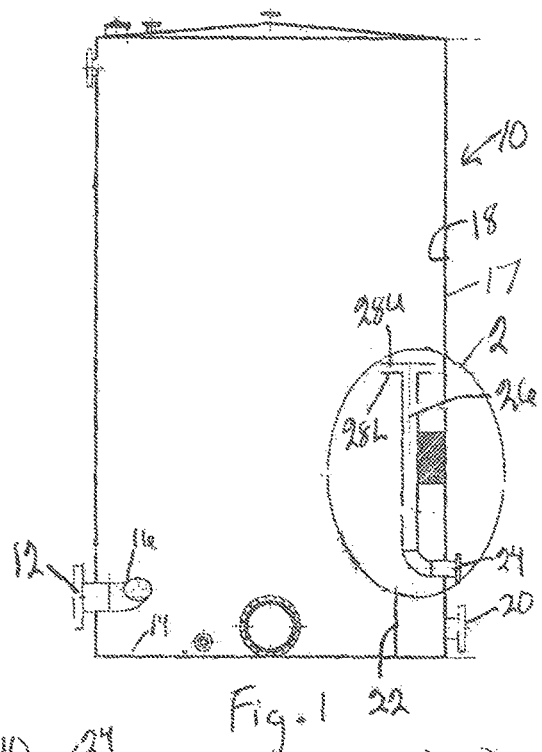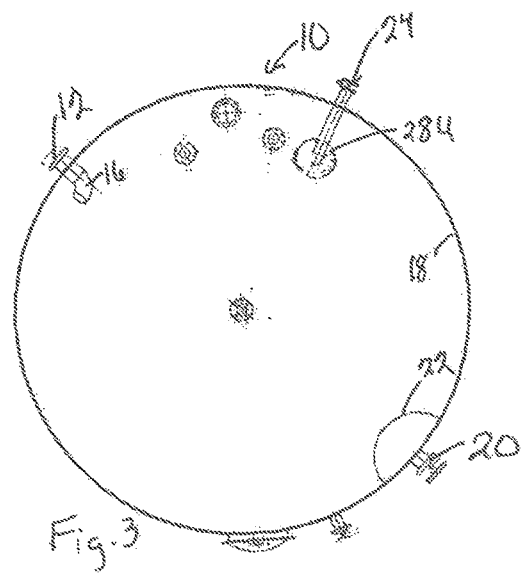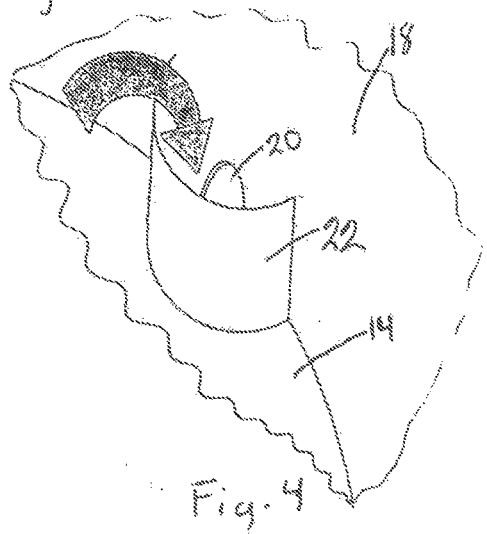

HIGHLY RETENTIVE AUTOMATICALLY SKIMMABLE TANK

BACKGROUND OF THE INVENTION

1. Field of the Invention

The present invention is a skimmer tank for skimming oil from water contained within the tank as it is being used as a water collection or water storage tank. The tank seeks to maximize retention time within the tank and to provide for automatic skimming of oil from the top of the tank without the need for any moving parts within the tank.

2. Description of the Related Art

Current oil skimmer tanks have moving parts that tend to cause problems. Also, most skimmer tanks require operator activation of oil removal from the tanks which can result in overflow of oil from the tanks. Additionally, because of the design of the tanks, the flow path of water through the tanks short circuits so that the retention time within the tank is less than optimum. Less retention time results in less effective separation of oil from the water, with loss of valuable oil and with production of waste water containing more oil-contamination which must be disposed. The more oil-contamination in the waste water creates a shortened life for waste water disposal wells and increases the cost of disposal.

The present invention addresses these problems by providing a skimmer tank that has no moving parts, is not operator activated and is designed to maximize retention time within the tank, resulting in better oil separation and recovery and cleaner water to be disposed.

SUMMARY OF THE INVENTION

The goal of the design of this water collection/storage tank is to 1) maximize retention time by redirecting the inlet flow to minimize that flow through the normal path of least resistance, and 2) to provide for the automatic skimming of oil from the top of the water collected/stored water layer below.

To achieve the first goal of maximizing retention time, the inlet flow stream is redirected through an extension of the inlet nozzle into a 90 degree long radius elbow which prevents the inlet flow from flowing directly through the tank to the outlet nozzle.

The 90 degree long radius nozzle is turned so the flow is counterclockwise in applications above the earth's equator, and clockwise in applications below the earth's equator. This is done to mimic the earth's rotation so natural flow tendencies are maintained rather than opposed. This compliments the natural rotation of the inlet fluid stream, thereby increasing the likelihood of increased retention time.

The 90 degree long radius elbow is positioned so the inlet flow is directed at an angle slightly less that than parallel to the inside diameter of the tank so the inlet fluid is forced to contact and impinge upon the internal diameter (ID) of the tank wall, thereby using the tank wall as an impingement baffle so that a portion of the oil entrained in the inlet water stream can impinge and attach to the tank wall ID. This impingement augments oil-water separation as droplets of oil collected on the surface of the tank wall tend to stay attached to the tank wall ID, wet its surface area, and eventually wick upward to disengage into and become a part of the oil layer above.

The 90 degree long radius elbow is fixed to the inlet nozzle turned upwards at a 15 degree angle. This upturn directs the inlet flow stream slightly upward in an upwardly rising helical flow pattern up and around the inside diameter of the tank. This helical flow pattern prevents the inlet stream from taking the path of least resistance directly from the inlet to the outlet of the tank, and instead causes the inlet flow stream to circulate in an upward rising spiraling helix flow path directed to the top of the fluid level in the tank at all times, thereby increasing the retention time of the inlet flow stream as the velocity of the stream is slowed by the distribution of the fluid across the outer 50% of the tank's horizontal cross section which contains approximately 80% of the tank's total volume, and thereby the majority of the potential retention time. As the fluid flow rate slows smaller and smaller droplets of oil naturally separate consistent with Stokes' Law of gravity separation. At the top of the fluid level oil-water separation has reached its maximum.

Then, as the helical flow path nears the top of the liquid level in the tank the momentum of the upward flowing fluid redirects the flow path of the fluid toward the center or middle 50% of the tank which represents only about 20% of the total tank volume. As the flow concentrates toward the middle of the tank near the top of the fluid level the radius of rotating helix begins to collapse on itself in a cyclonic, downward flowing decreasing radius flow path through the smaller retentive area of the tank in the center of the tank. As the radius of the now downward flowing stream diminishes, the flow stream begins to accelerate and a reducing radius helical flow path downward toward the middle of the tank is established.

At this point any separation that was going to occur by virtue of impingement on the tank walls and by virtue of Stokes' Law ceases, and the accelerating water stream moves down to near the bottom of the tank, across the tank bottom under the inlet flow path toward the outlet nozzle, and leaves the tank via the water outlet nozzle. The water outlet nozzle is located on the opposite side of the tank from the water inlet nozzle.

The result is for an oil layer to accumulate on top of the water, regardless of the tank's fluid level. As more water flows through the tank more oil accumulates, building an ever-thicker or deeper layer of oil above the water.

Since the throughput rate of the inlet water stream in most process plants is rarely 100% consistent, the overall level in tanks used for this purpose is ever changing. The challenge therefore is to allow the liquid levels to rise and fall consistent with the incoming fluid loading, while removing the more valuable oil layer as frequently as circumstances allow.

To achieve the second goal of automatically skimming and removing the oil from the tank, a dedicated oil withdrawal system is installed within the tank. This is a piping system designed to collect oil and prevent vortexing. To accomplish this function the oil outlet nozzle is extended through the tank wall and turned upward. This nozzle is normally one or two pipe diameters oversized to minimize pressure drop and assure the low velocity extraction of a horizontal layer of oil above the water to prevent vortexing of either gas above the oil or water below the oil layer.

In order to augment the nozzle velocity consideration two horizontal anti-vortex plates are added to the top of the outlet nozzle riser. These horizontal plates are each approximately 24 inches in diameter and are separated by 4 inches using four pieces of thin strap material aimed parallel to the flow path between the plates. The bottom plate is perforated in its center to allow the outlet riser nozzle to penetrate it though a similarly sized hole. Therefore, oil flowing out of the tank must flow horizontally between the two anti-vortex plates, into the hole in the bottom plate, down through the outlet nozzle riser, turn horizontally to exit the tank with the oil outlet.

With the flow of oil now controlled to prevent vortexing, the skimming function is focused on the features that automate it.

Automating the skimming function is the key to maximizing oil recovery and preventing tank overflow and resulting oil losses. Automating this skimming function also takes the human element out of the skimming process, freeing up operation personnel to perform other tasks which may require less precision.

The automation system necessary to accomplish automatic skimming employs 1) a sophisticated level transmitter, 2) an electrically actuated valve, 3) a low shear oil transfer pump, and 4) a dedicated software algorithm.

The level transmitter used here is a device that electronically detects both the oil-gas interface, i.e. the tank liquid level, and the oil-water interface below. This can be a dual channel guided wave radar transmitter in applications where the oil layer has little or no entrained emulsion, or a combination transmitter with guided wave radar to detect the oil-gas interface and a capacitance feature to detect the emulsion-water interface. In either case the detection of these two interfaces is the key.

Once the level transmitter is calibrated to detect the two key interfaces, it is then tasked to do so, interfacing with a programmable logic controller (or PLC) programmed to trigger the automatic electrically actuated valve and its associated low shear transfer pump. A dedicated automation software algorithm is installed in the PLC which allows the automatic valve to open and the pump to start only when two specific conditions are met simultaneously. These conditions are 1) the oil-gas interface is above the elevation of the upper anti-vortex plate on the oil outlet riser, and 2) the oil/emulsion-water interface is below the lower anti-vortex plate on the outlet oil nozzle riser. When both of these two conditions are met, the automatic valve is opened and the low shear pump is started and oil is pumped out of the skimmer tank and directly into oil storage tanks. When either or both of these conditions are not met, the PLC prevents the valve from opening if the valve is closed and prevents the low shear pump from starting, or closes the valve if the valve is open and stops the low shear pump.

The low shear pump by definition prevents the shearing of oil and water droplets by its design, thus minimizing the re-emulsification of oil and water. This allows all freely separable water to separate from the oil according to Stokes' Law when it reaches the oil storage tanks, rendering the oil emulsion free.

BRIEF DESCRIPTION OF THE DRAWINGS

FIG. 1 is cut away elevation view of a highly retentive automatically skimmable tank that is constructed in accordance with a preferred embodiment of the present invention.

FIG. 2 is an enlarged isometric view of the oil outlet nozzle riser and its associated two horizontal anti-vortex plates shown within circle 2 of FIG. 1.

FIG. 3 is a cut away top plan view of the tank of FIG. 1.

FIG. 4 is an enlarged isometric view of the sand dam overflow and associated water outlet nozzle.

DETAILED DESCRIPTION OF THE PREFERRED EMBODIMENT

Figure 5:
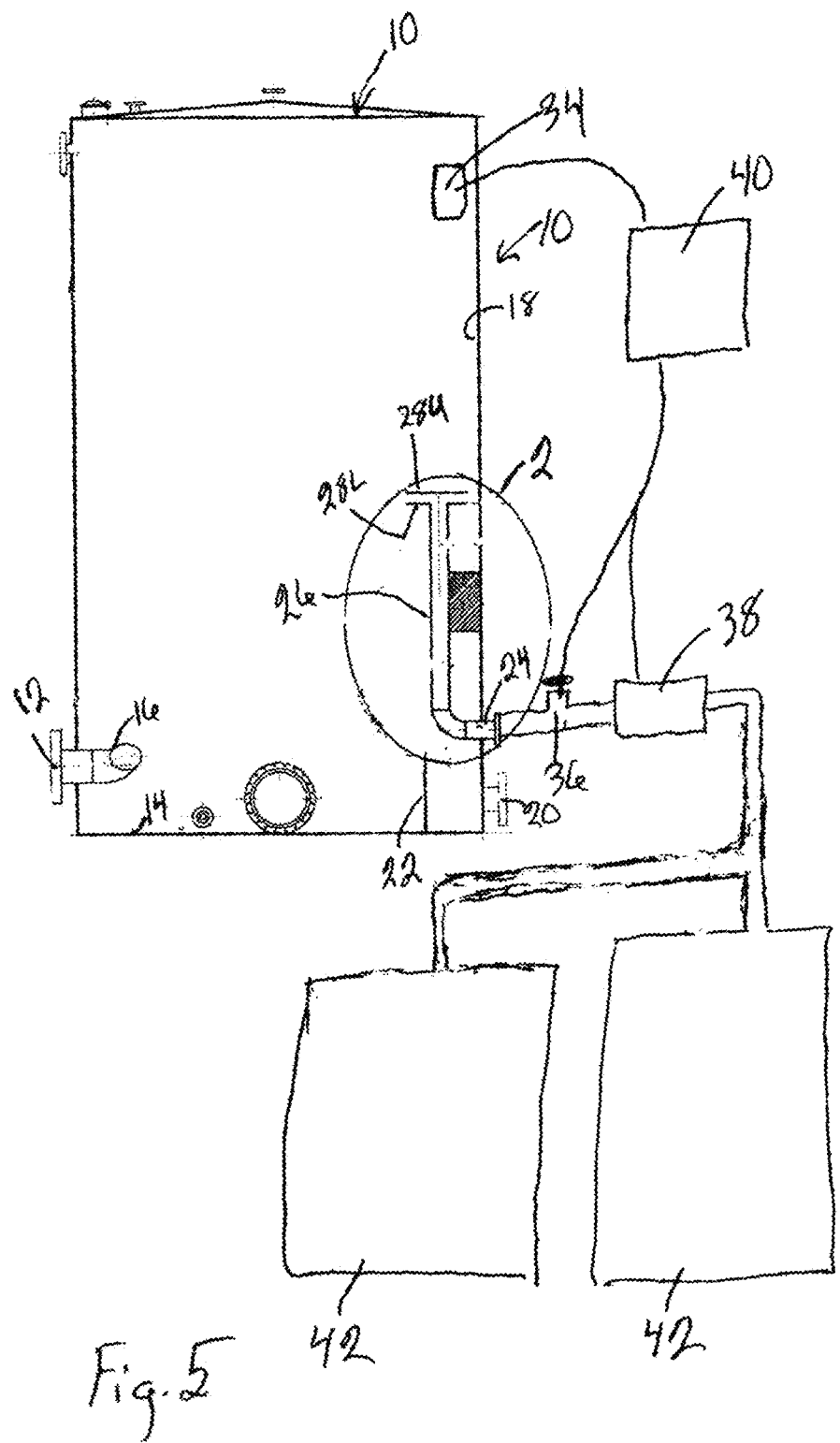
FIG. 5 is a diagram showing the automation system associated with the tank of FIG. 1.

Referring now to the drawings and initially to FIGS. 1 and 3, there is illustrated a highly retentive automatically skimmable tank 10 that is constructed in accordance with a preferred embodiment of the present invention. The tank 10 is provided with a water inlet nozzle 12 that enters the tank 10 adjacent the bottom 14 of the tank 10. The water inlet nozzle 12 is provided with an extension in the form of a 90 degree long radius elbow 16 that points upward within the tank 10 at approximately a 15 degree angle.

The 90 degree long radius elbow 16 is turned to the right so the flow is counterclockwise in applications above the earth's equator, and turned to the left so the flow is clockwise in applications below the earth's equator.

The 90 degree long radius elbow 16 is positioned so the inlet flow is directed at an angle slightly less than parallel to the inside diameter (ID) or inside surface 18 of the tank wall 17 of the tank 10 so the inlet fluid is forced to contact and impinge upon the ID 18 of the tank 10, thereby using the inside tank surface 18 as an impingement baffle. This impingement augments oil-water separation as droplets of oil collected on the inside wall surface 18 of the tank 10 tend to stay attached to the inside surface 18, wet its surface area, and eventually wick upward to disengage into and become a part of the oil layer that is located above the water layer within the tank 10.

As previously stated, the 90 degree long radius elbow 16 is affixed to the water inlet nozzle 12 so that it is turned upwards at approximately a 15 degree angle. This directs the inlet flow stream slightly upward in an upwardly rising helical flow pattern around the inside diameter 18 of the tank 10. This helical flow pattern prevents the inlet stream from taking the path of least resistance directly from the water inlet nozzle 12 to the water outlet nozzle 20 of the tank 10, and instead causes the inlet flow stream to circulate in an upward rising, spiraling, helix flow path directed to the top of the fluid level in the tank 10, thereby increasing the retention time of the inlet flow stream as the velocity of the stream is slowed by the distribution of the fluid across the outer 50% of the tank's horizontal cross section.

As the fluid flow rate slows smaller and smaller droplets of oil naturally separate consistent with Stokes' Law of gravity separation. At the top of the fluid level oil-water separation has reached its maximum.

Then, as the helical flow path nears the top of the liquid level in the tank 10 the momentum of the upward flowing fluid redirects the flow path of the fluid toward the center or middle 50% of the tank 10. As the flow concentrates toward the middle of the tank 10 near the top of the fluid level the radius of rotating helix begins to collapse on itself in a cyclonic, downward flowing decreasing radius flow path through the smaller retentive area of the tank 10 in the center of the tank 10. As the radius of the now downward flowing stream diminishes, the flow stream begins to accelerate and a reducing radius helical flow path downward toward the middle of the tank 10 is established.

At this point any separation that was going to occur by virtue of impingement on the tank walls and by virtue of Stokes' Law ceases, and the accelerating water stream moves down to near the bottom 14 of the tank 10, across the tank bottom 14 under the inlet flow path toward the water outlet nozzle 20, over the associated sand dam 22, into the water outlet nozzle 20 and leaves the tank 10 via the water outlet nozzle 20. The sand dam 22 is best shown in FIG. 4. The sand dam 22 is open on top and is secured to the inside diameter 18 and the bottom 14 of the tank 10. The sand dam 22 helps to prevent sand and other sediment from entering the water outlet nozzle 20. The water outlet nozzle 20 is preferably located on an opposite side of the tank 10 from the water inlet nozzle 12, as illustrated in FIG. 3.

The result is that an oil layer accumulates on top of the water layer, regardless of the tank's fluid level. As more water flows through the tank 10 more oil accumulates, building an ever-thicker or deeper layer of oil above the water.

Since the throughput rate of the inlet water stream in most process plants is rarely 100% consistent, the overall level in tanks used for this purpose is ever changing. The challenge therefore is to allow the liquid levels to rise and fall consistent with the incoming fluid loading, while removing the more valuable oil layer as frequently as circumstances allow.

To automatically skim and remove the separated oil from the tank 10, a dedicated oil withdrawal system is installed within the tank 10, as illustrated in FIG. 2. This is a piping system designed to collect oil and prevent vortexing. It consists of an oil outlet nozzle 24, oil outlet riser 26 and anti-vortex plates 28U and 28L.

The oil outlet nozzle 24 extends through the tank wall 14 and is turned upward to form the oil outlet nozzle riser 26 within the tank 10. The oil outlet nozzle 24 and riser 26 are normally one or two pipe diameters oversized to minimize pressure drop and assure the low velocity extraction of a horizontal layer of oil above the water to prevent vortexing of either gas above the oil or water below the oil layer.

In order to augment the nozzle velocity consideration and upper horizontal anti-vortex plate 28U and a lower horizontal anti-vortex plate 28L are added to the top of the oil outlet nozzle riser 26. These horizontal plates 28U and 28L are each approximately 24 inches in diameter and are separated by 4 inches using four pieces of thin strap material 30 aimed parallel to the flow path between the plates 28U and 28L. The bottom or lower plate 28L is perforated in its center to allow the outlet riser nozzle to penetrate it though a similarly sized hole 32, as illustrated in FIG. 2. Therefore, oil flowing out of the tank 10 must flow horizontally between the two anti-vortex plates 28U and 28L, into the hole 32 in the bottom plate 28L, down through the oil outlet riser 26, and then turn horizontally within the riser 26 to exit the tank 10 via the oil outlet nozzle 24.

Automating the skimming function is the key to maximizing oil recovery and preventing tank overflow and resulting oil losses. Automating this skimming function also takes the human element out of the skimming process, freeing up operation personnel to perform other tasks which may require less precision. Referring to FIG. 5, the automation system associated with the tank 10 for controlling its operation is illustrated. The automation system necessary to accomplish automatic skimming employs a sophisticated level transmitter 34, an electrically actuated oil valve 36, a low shear oil transfer pump 38, and a dedicated software algorithm contained within a programmable logic controller (PLC) 40.

The level transmitter 34 used here is a device that electronically detects both the oil-gas interface, i.e. the tank liquid level, and the oil-water interface located below. This can be a dual channel guided wave radar transmitter in applications where the oil layer has little or no entrained emulsion, or a combination transmitter with guided wave radar to detect the oil-gas interface and a capacitance feature to detect the emulsion-water interface. In either case the detection of these two interfaces is the key.

Once the level transmitter 34 is calibrated to detect the two key interfaces, it is then tasked to do so, interfacing with the PLC 40 programmed to trigger the automatic electrically actuated oil valve 36 and its associated low shear transfer pump 38. The dedicated automation software algorithm installed in the PLC 40 which allows the automatic valve 36 to open and the pump 38 to start only when two specific conditions are met simultaneously.

These conditions are: 1) the oil-gas interface is above the elevation of the upper anti-vortex plate 28U on the oil outlet riser 26, and 2) the oil-water interface or alternately the emulsion-water interface is below the lower anti-vortex plate 28L on the outlet oil nozzle riser 26. When both of these two conditions are met, the automatic valve 36 is opened and the low shear pump 38 is started and oil is pumped out of the skimmer tank 10 and directly into oil storage tanks 42. When either or both of these conditions are not met, the PLC 40 prevents the valve 36 from opening if the valve 36 is closed and prevents the low shear pump 38 from starting, or alternately, closes the valve 36 if the valve 36 is open and stops the low shear pump 38.

The low shear pump 38 by definition prevents the shearing of oil and water droplets by its design, thus minimizing the re-emulsification of oil and water. This allows all freely separable water to separate from the oil according to Stokes' Law when it reaches the oil storage tanks 42, rendering the oil emulsion-free.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An automatically skimmable tank for removing oil from water comprising:
   a tank,
   a water inlet provided in the tank adjacent a bottom of the tank, an elbow provided on the water inlet so that the elbow directs incoming flow sideways and upward causing flow to first impinge on an inside diameter of the tank then flow upward helically around the tank's inside diameter,
   an oil outlet provided in the tank, an upwardly extending oil outlet riser attached to the oil outlet and extending upward within the tank,
   spaced apart upper and lower horizontal anti-vortex plates attached to an open top of the oil outlet riser so that the open top of the riser communicates between the upper and the lower plates, and
   a water outlet provided in the tank adjacent the bottom of the tank.

2. An automatically skimmable tank for removing oil from water according to claim 1 further comprising:
   a level transmitter capable of sensing an oil-gas interface and the oil-water interface within the tank, said level transmitter communicating with a programmed PLC, and
   said PLC functionally connected to an oil valve that is attached to the oil outlet and said PLC functionally connected to a low shear oil transfer pump attached to the oil valve such that the PLC controls the opening of the oil valve and controls activation of the pump to remove oil from the tank when the level transmitter simultaneously senses the oil-gas interface is above the upper anti-vortex plate and the oil-water interface is below the lower anti-vortex plate.

3. An automatically skimmable tank for removing oil from water according to claim 1 further comprising:
   a sand dam surrounding said water outlet.

4. An automatically skimmable tank for removing oil from water according to claim 1 further comprising:
   strap material holding the upper and lower anti-vortex plates spaced apart.

5. An automatically skimmable tank for removing oil from water according to claim 1 wherein said elbow provided on the water inlet is oriented in a counterclockwise direction for tanks installed in the northern hemisphere and oriented in a clockwise direction for tanks installed in the southern hemisphere.

6. An automatically skimmable tank for removing oil from water according to claim 1 wherein said elbow is oriented at an angle of between 10 and 20 degrees above horizontal.

7. An automatically skimmable tank for removing oil from water according to claim 6 wherein said elbow is oriented at an angle of 15 degrees above horizontal.

8. An automatically skimmable tank for removing oil from water according to claim 1 wherein said water outlet is located on the opposite side of the tank from the water inlet.

* * * * *